United States Patent
Park et al.

(10) Patent No.: US 10,606,407 B2
(45) Date of Patent: Mar. 31, 2020

(54) FORCE-BASED TOUCH INTERFACE DEVICE AND METHOD FOR CORRECTING THE FORCE-BASED TOUCH INTERFACE DEVICE

(71) Applicant: HYUNDAI MOTOR COMPANY, Seoul (KR)

(72) Inventors: Sung Min Park, Seoul (KR); Kwang Myung Oh, Suwon-si (KR); Sung Jin Sah, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 101 days.

(21) Appl. No.: 15/366,862

(22) Filed: Dec. 1, 2016

(65) Prior Publication Data

US 2017/0322671 A1 Nov. 9, 2017

(30) Foreign Application Priority Data

May 4, 2016 (KR) .................. 10-2016-0055655

(51) Int. Cl.
*G09G 1/00* (2006.01)
*G06F 3/041* (2006.01)
(Continued)

(52) U.S. Cl.
CPC .......... *G06F 3/0418* (2013.01); *G06F 3/0414* (2013.01); *G06F 3/044* (2013.01); *G06F 3/045* (2013.01); *G06F 2203/04105* (2013.01)

(58) Field of Classification Search
CPC ............. G06F 3/041; G09G 5/00; G09G 1/00
See application file for complete search history.

(56) References Cited

U.S. PATENT DOCUMENTS 5,038,142 A 8/1991 Flower et al.
7,158,122 B2 1/2007 Roberts
(Continued)

FOREIGN PATENT DOCUMENTS

JP 5460758 B2 4/2014
KR 20-0125589 Y 12/1998
(Continued)

OTHER PUBLICATIONS

Korean Notice of Allowance dated Jan. 17, 2017, issued in Korean patent application No. 10-2016-0055655.

*Primary Examiner* — Michael A Faragalla
(74) *Attorney, Agent, or Firm* — Morgan, Lewis & Brockius LLP

(57) ABSTRACT

A force based touch interface device comprising a touch substrate, a torsion preventing structure for preventing torsion of the touch substrate by an externally-applied force touch, a plurality of sensors for measuring the force touch applied to the touch substrate at different positions, an input device for applying the force touch onto the touch substrate, and a controller for measuring force data using the plurality of sensors when the force touch is applied onto the touch substrate, for estimating force data for symmetrical points for touch points to which the force touch is applied using the measured force data, and for comparing the measured force data and the estimated force data with ideal force data to generate a calibration matrix for correcting a process error.

12 Claims, 14 Drawing Sheets

(51) Int. Cl.
   *G06F 3/044* (2006.01)
   *G06F 3/045* (2006.01)

(56) References Cited

U.S. PATENT DOCUMENTS

| | | | |
|---|---|---|---|
| 2003/0214485 A1* | 11/2003 | Roberts | G06F 3/0414 345/173 |
| 2006/0227114 A1 | 10/2006 | Geaghan et al. | |
| 2007/0052690 A1 | 3/2007 | Roberts | |
| 2010/0085325 A1 | 4/2010 | King-Smith et al. | |
| 2011/0084911 A1* | 4/2011 | Simmons | G06F 3/0412 345/173 |
| 2013/0271434 A1 | 10/2013 | King-Smith et al. | |
| 2013/0342501 A1* | 12/2013 | Molne | G06F 3/0414 345/174 |
| 2014/0210782 A1 | 7/2014 | King-Smith et al. | |
| 2014/0210783 A1 | 7/2014 | King-Smith et al. | |
| 2014/0210785 A1 | 7/2014 | King-Smith et al. | |
| 2014/0210787 A1 | 7/2014 | King-Smith et al. | |
| 2015/0277595 A1 | 10/2015 | King-Smith et al. | |
| 2015/0277658 A1 | 10/2015 | King-Smith et al. | |
| 2015/0317002 A1 | 11/2015 | King-Smith et al. | |
| 2016/0103544 A1* | 4/2016 | Filiz | G06F 3/0414 345/174 |

FOREIGN PATENT DOCUMENTS

| | | |
|---|---|---|
| KR | 10-2004-0111634 A | 12/2004 |
| KR | 10-2010-0038067 A | 4/2010 |
| KR | 10-2014-0089224 A | 7/2014 |

* cited by examiner

FORCE-BASED TOUCH INTERFACE DEVICE AND METHOD FOR CORRECTING THE FORCE-BASED TOUCH INTERFACE DEVICE

CROSS-REFERENCE TO RELATED APPLICATION

This application claims the benefit of priority to Korean Patent Application No. 10-2016-0055655, filed on May 4, 2016 with the Korean Intellectual Property Office, the disclosure of which is incorporated herein in its entirety by reference.

TECHNICAL FIELD

The present disclosure relates to a force-based touch interface device that improves accuracy of measurement by correcting manufacturing errors when a force magnitude and a touch position of force touch applied on a force-based touch pad are measured, and a method for correcting the force-based touch interface device.

BACKGROUND

A touch panel is a user interface (UI) capable of simply and instinctively inputting, and receiving, a user manipulation by touching a surface or a defined contact surface of a display with a finger or an electronic pen. Such a touch panel has been applied to various applications such as a navigation terminal, a telematics terminal, a personal digital assistant (PDA), a laptop computer, a notebook computer and a smart phone.

The touch panel uses touch recognition technologies such as a resistive overlay, a capacitive overlay, a surface acoustic wave and an infrared beam. Since the touch panel provides an instinctive and flexible UI and has high function extensibility, it has been utilized as a control system of a vehicle which becomes complex due to an increase of convenience, safety and infotainment functions, but has a limit in that it does not provide a blind control because the touch panel recognizes a touch position at the instant at which a user's finger touches the touch panel.

In order to solve the above-mentioned problem, a force based touch pad that classifies search and input intentions of the user by sensing force touch has been suggested. In such a force-based touch pad, the touch pad may be bent or distorted by a force touch of the user. As a result, a force magnitude and a touch position of the force touch may be inaccurately measured. Accordingly, the related art addresses that error by suggesting that a torsion of the touch pad is corrected by calibration.

However, since the force based touch pad according to the related art allows the touch pad to be bent, it has a structure in which it is difficult to detect a magnitude of an absorbed force due to a modification of the pad. As a result, when the search and input intentions of the user are classified by the magnitude of force, an accuracy of recognition may be degraded.

SUMMARY

The present disclosure has been made to solve the above-mentioned problems occurring in the prior art while advantages achieved by the prior art are maintained intact.

An aspect of the present disclosure provides a force based touch interface device that improves accuracy of measurement by correcting a manufacturing error when a force magnitude and a touch position of force touch applied on a force based touch pad are measured, and a method for correcting the same.

According to an exemplary embodiment of the present disclosure, a touch interface device includes a touch substrate; a torsion preventing structure for preventing torsion of the touch substrate by force touch applied from the outside; a plurality of sensors for measuring the force touch applied to the touch substrate at different positions; an input device for applying the force touch onto the touch substrate; and a controller for measuring force data using the plurality of sensors when the force touch is applied onto the touch substrate, for estimating force data for symmetrical points for touch points to which the force touch is applied using the measured force data, and for comparing the measured force data and the estimated force data with ideal force data to generate a calibration matrix for correcting manufacturing error.

The torsion preventing structure may include an edge frame formed to correspond to the touch substrate, and a plurality of ribs formed inside of the edge frame.

The torsion preventing structure may include a plurality of bars connected to one another to support a touch surface.

The plurality of sensors may include any one of a strain gauge, a force sensitive resistor (FSR) and a capacitive sensor.

The plurality of sensors may include three or more sensors, and each may be disposed to be symmetrical with each other based on a line passing through a center of gravity.

The number of touch points may be determined according to the number of sensors.

The controller may compare the force data of the touch points and the symmetrical points with ideal force data to calculate relationships between two data.

The controller may calculate calibration parameters from the calculated relationships to generate the calibration matrix.

A manufacturing error may be an error caused by a misalignment of the respective sensors.

The controller may correct the force data measured by the plurality of sensors using the calibration matrix, and may calculate a touch position to which the force touch is applied by applying the corrected force data to a force-moment equilibrium equation.

According to another exemplary embodiment of the present disclosure, a method for correcting a force based touch interface device including a torsion preventing structure preventing torsion of a touch substrate includes: when a force touch is applied onto the touch substrate, collecting measured force data using a plurality of sensors measured at different positions; estimating force data for symmetrical points for touch points to which the the force touch is applied based on the measured force data; and generating a calibration matrix for correcting a process error by comparing the force data measured for each of the touch points and the force data estimated for each of the symmetrical points with ideal force data.

The method may further include, before the step of collecting the measured force data, defining the number of touch points, positions thereof, touch strengths thereof and a touch order thereof.

The number of touch points may be n/2 or more when the number n of sensors is an even number.

The number of touch points may be (n+1)/2 or more when the number n of sensors is an odd number.

In the step of generating the calibration matrix, the measured force data and the estimated force data may be compared with ideal force data to calculate relationships, and calibration parameters may be calculated from the calculated relationships to generate the calibration matrix.

The method may further include, after the step of generating the calibration matrix, measuring the force data using the plurality of sensors when the force touch is applied onto the touch substrate, correcting a manufacturing error included in the measured force data using the calibration matrix, and then calculating a touch position using the corrected force data.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Throughout the present specification, since the terms "comprising", "configuring", "having", and the like may mean that the corresponding element may be embedded unless explicitly described to the contrary in the present specification, such description means the inclusion of other elements rather than the exclusion of any other elements.

In addition, the terms "-er", "-or", "module", and the like described in the present specification mean units for processing at least one function and operation, and can be implemented by hardware, software, or combinations thereof. In addition, articles such as "a", "an", "the" and the like may be used to include both singular forms and plural forms unless the context clearly indicates otherwise, in the context describing the present disclosure.

Hereinafter, exemplary embodiments of the present disclosure will be described in detail with reference to the accompanying drawings.

The present disclosure relates to a technology of recognizing a force magnitude (sum) and a touch position of a force touch applied to a touch pad by a user using a force sensor, and improves recognition accuracy of the touch position by correcting errors caused by misalignment of the force sensor and modification of a beam on which the force sensor is supported.

Figure 1:
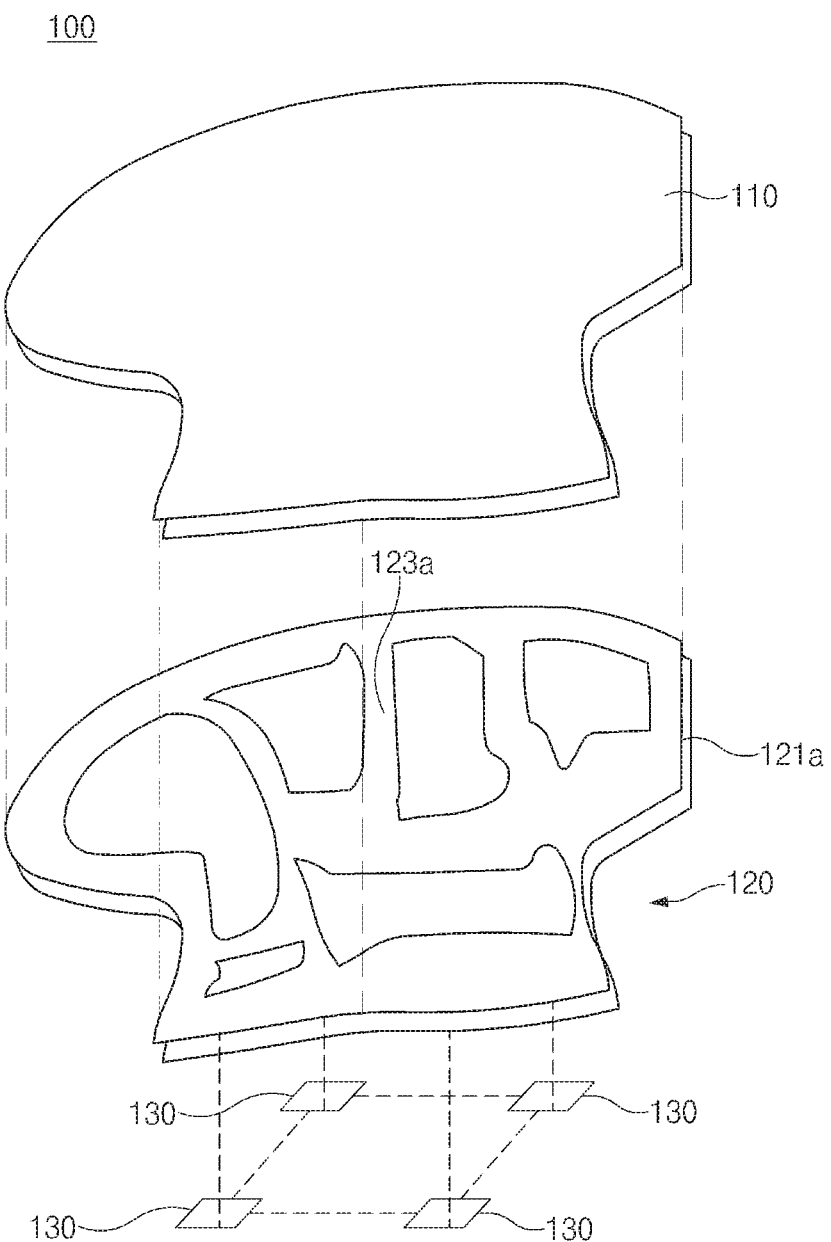
FIG. 1 is a schematic exploded perspective view of a touch pad according to exemplary embodiments of the present disclosure.
Figure 2A:
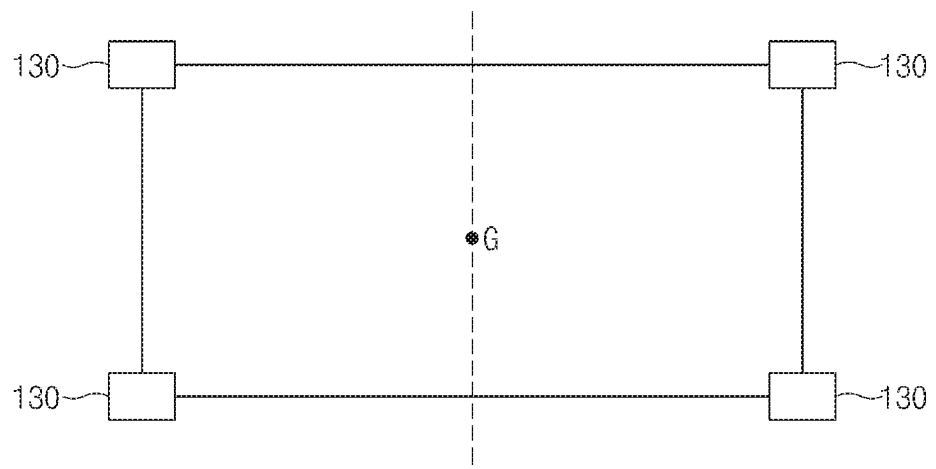
FIGS. 2A to 2C are illustrative views showing a layout structure of a force sensor according to exemplary embodiments of the present disclosure.
Figure 2B:
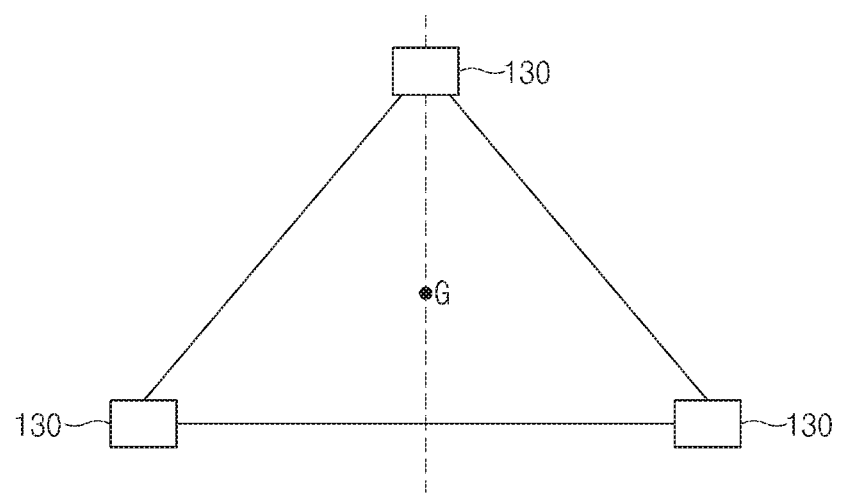
Figure 2C:
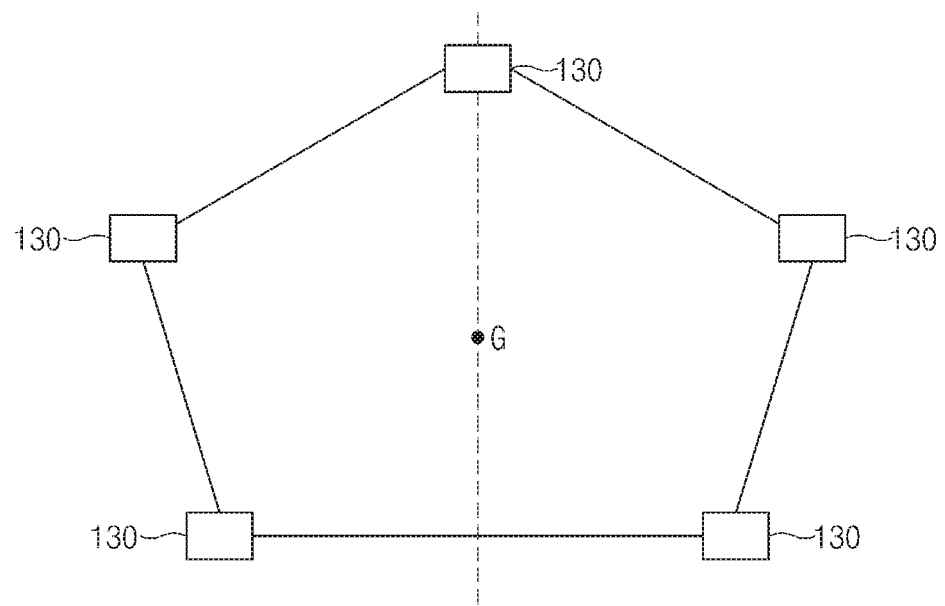

FIG. 1 is a schematic exploded perspective view of a touch pad according to exemplary embodiments of the present disclosure and FIGS. 2A to 2C are illustrative views showing a layout structure of a force sensor according to exemplary embodiments of the present disclosure.

As illustrated in FIG. 1, a touch pad 100, in certain embodiments, includes a touch substrate 110, a torsion preventing structure 120 and a plurality of sensors 130.

The touch substrate 110 is an area to which a user applies a force touch using a touch tool such as a finger or a stylus pen. The touch substrate 110 may be formed of an acrylic resin, plastic or glass.

The touch substrate 110 may be formed in a flat plate having a quadrangular shape or a circular shape. However, the shape of the touch substrate 110 is not limited thereto, and may be variously modified according to a product to which the touch substrate 110 is applied. For example, the touch substrate 110 may also be formed in, or on, a curved surface.

In addition, the touch substrate 110 may also be implemented as a touch panel or a touch screen including a touch sensor.

The torsion preventing structure 120 is formed below the touch substrate 110 to serve to prevent the touch substrate 110 from being bent or twisted by a force (force touch) applied from the outside. In other words, when the touch substrate 110 is bent by an external force, the external force corresponding to the bending of the touch substrate 110 is not transferred to the sensor 130. Accordingly, the torsion preventing structure 120 is installed for the purpose of preventing the above-mentioned phenomenon.

The torsion preventing structure 120 includes an edge frame 121a corresponding to the touch substrate 110, and a plurality of ribs 123a are regularly or irregularly formed inside of the edge frame 121a.

The plurality of sensors 130 are disposed below the torsion preventing structure 120 to thereby generate force data corresponding to the force touch applied to the touch substrate 110. The plurality of sensors 130 support a weight of the touch substrate 110, and are installed to be directed in a direction of a z axis. The sensor 130 may include a force sensor such as a strain gauge, a force sensitive resistor (FSR) or a capacitive sensor.

The plurality of sensors 130 are symmetrically disposed on the same plane based on a line passing through the center of gravity G as illustrated in FIGS. 2A to 2C. The touch pad 110 includes three or more force sensors 130, in some implementations.

Figure 3:
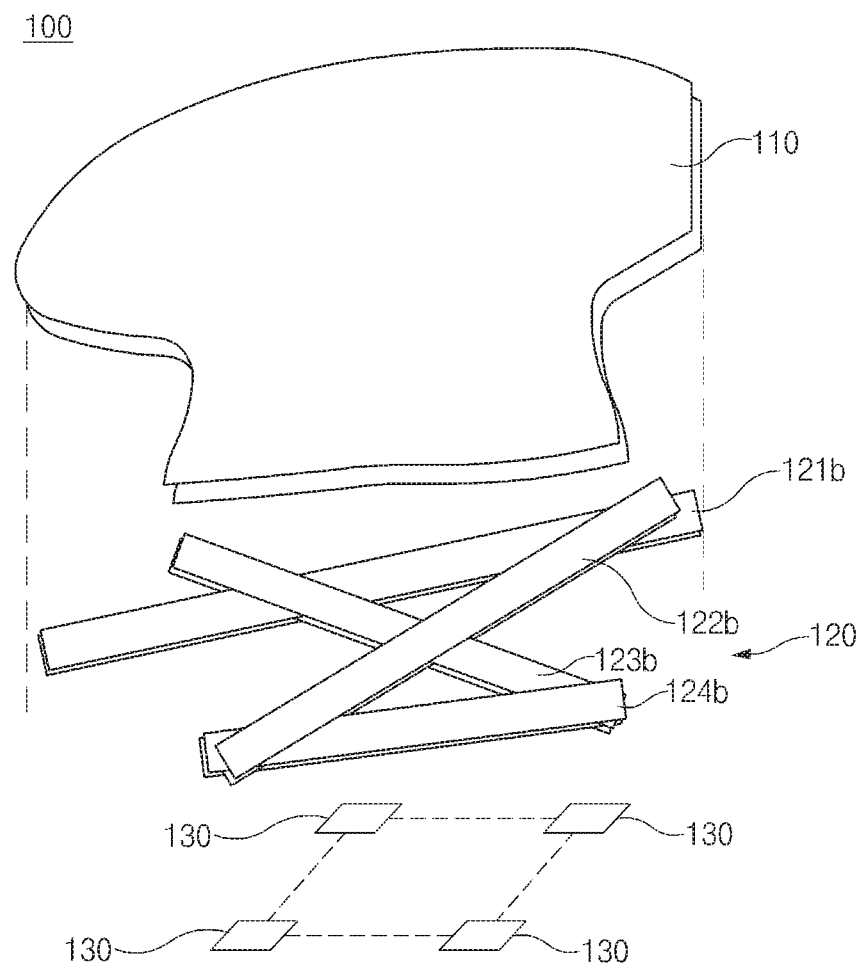
FIG. 3 is a schematic exploded perspective view of a touch pad according to exemplary embodiments of the present disclosure.

FIG. 3 illustrates a schematic exploded perspective view of a touch pad according to an exemplary embodiment of the present disclosure. In the exemplary embodiment, a detailed description of the same components as those of the exemplary embodiment illustrated in FIG. 1 will be omitted.

The touch pad 100 includes the touch substrate 110, the torsion preventing structure 120 and the plurality of sensors 130.

The torsion preventing structure 120 is disposed between the touch substrate 110 and the sensor 130 to prevent torsion of the touch substrate 110 caused by the force touch. The torsion preventing structure 120 includes a plurality of bars 121b, 122b, 123b and 124b. The plurality of bars (121b to 124b) are regularly or irregularly connected to one another to minimize the torsion of the touch substrate 110. Although the exemplary embodiment describes the case in which the plurality of bars are formed in a stick shape, the shape of the bar is not limited thereto and may be variously modified.

When the force touch is applied to the touch substrate 110, the sensors 130 output sensor values (e.g., voltages) which are changed depending on a magnitude and a position of the force touch.

Figure 4:
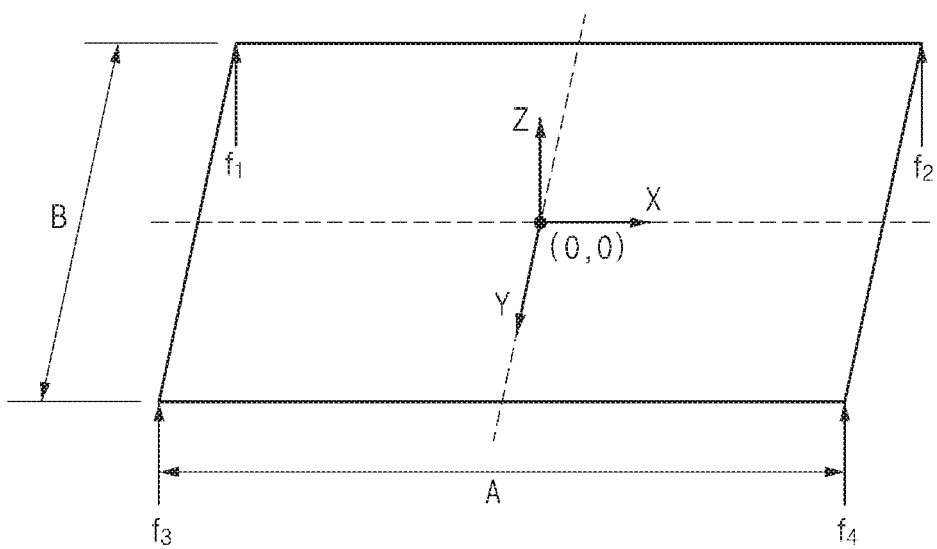
FIG. 4 is a view illustrating an ideal touch position measurement algorithm according to exemplary embodiments of the present disclosure.
Figure 5:
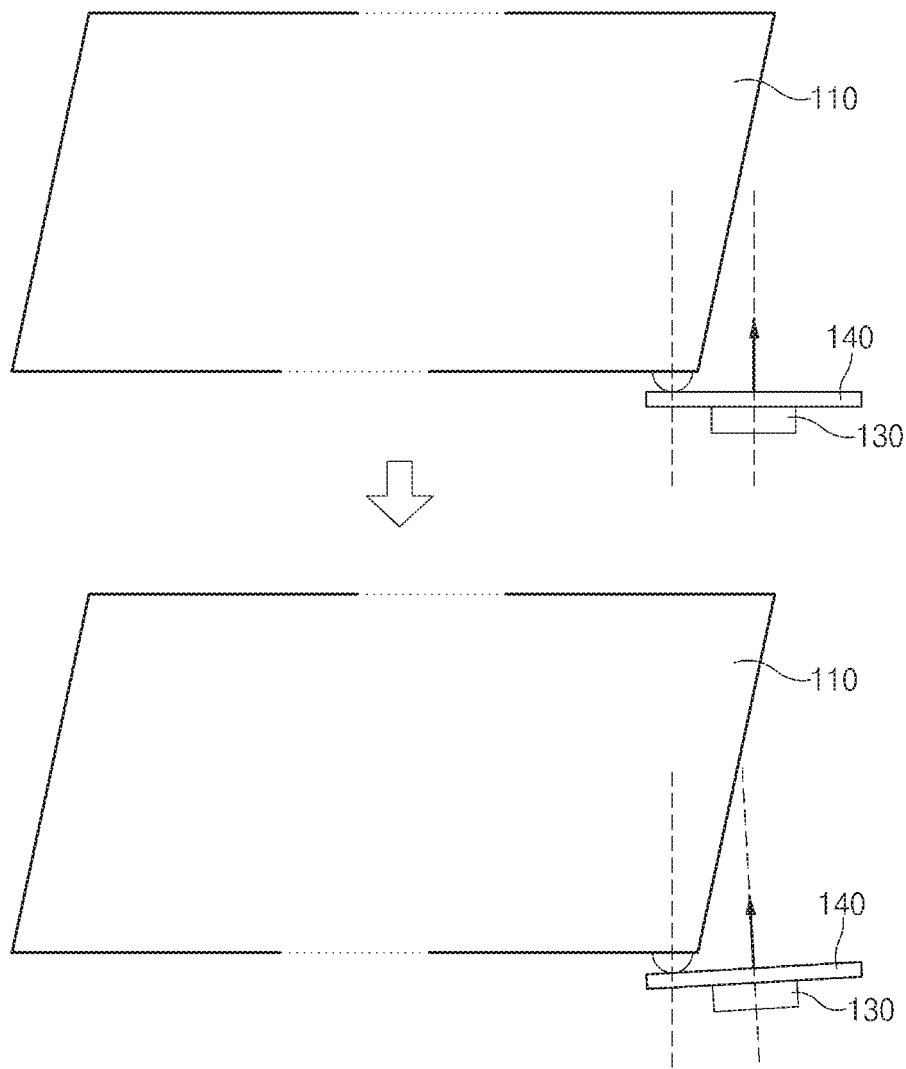
FIG. 5 is a view illustrating an error caused by a misalignment of a sensor according to exemplary embodiments of the present disclosure.
Figure 6:
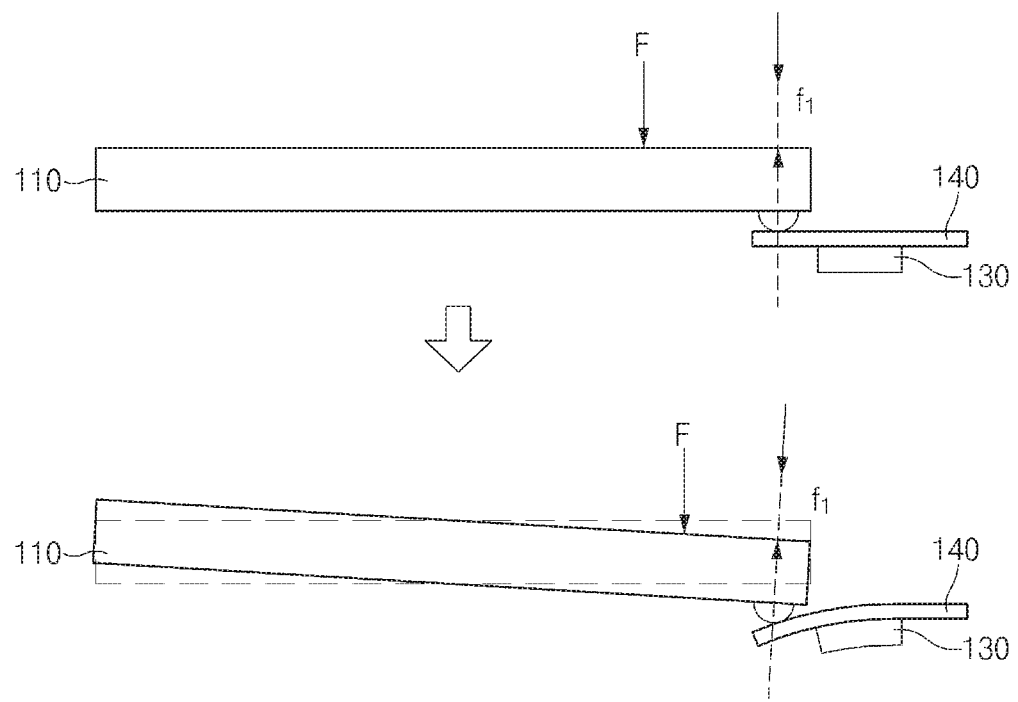
FIG. 6 is a view illustrating error caused by a displacement of a touch substrate according to exemplary embodiments of the present disclosure.
Figure 7:
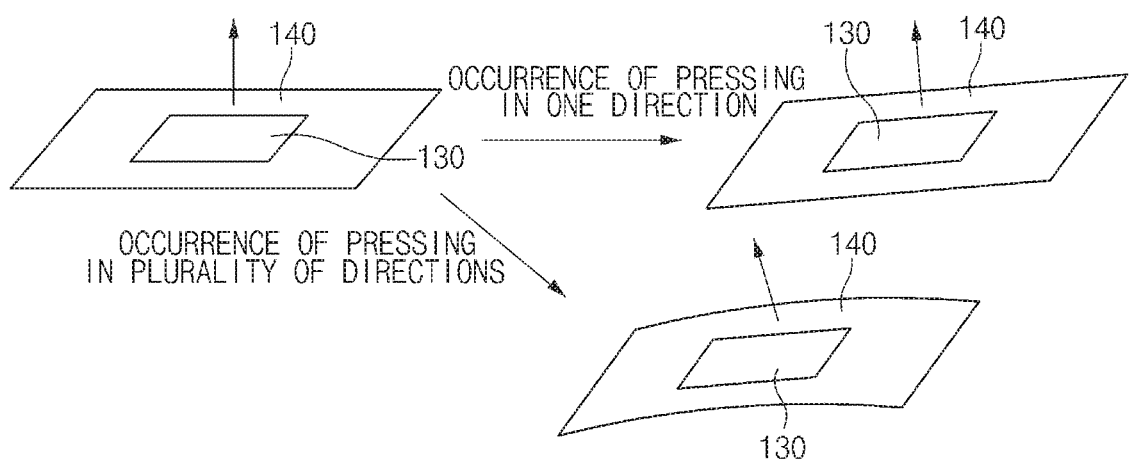
FIG. 7 is a view illustrating an error caused by a modification of a beam on which the sensor is supported according to exemplary embodiments of the present disclosure.

FIG. 4 is a view illustrating an ideal touch position measurement algorithm according to embodiments of the present disclosure, FIG. 5 is a view illustrating an error caused by a misalignment of a sensor according to exemplary embodiments of the present disclosure, FIG. 6 is a view illustrating an error caused by a displacement of a touch substrate according to exemplary embodiments of the present disclosure, and FIG. 7 is a view illustrating an error caused by a modification of a beam on which the sensor is supported according to exemplary embodiments of the present disclosure.

Four sensors 130 are installed to be directed to a bottom surface (the direction of the z axis) of the touch substrate 110 to measure a force applied to the touch substrate 110 and to output the measured force as an analog signal (e.g., a voltage). The touch interface device collects measurement values measured by the respective sensors 130 at a defined sampling period. In addition, the touch interface device converts a measured voltage value into a value of force (force data) based on a relationship between the force and the measurement values of the sensors 130. In this case, the touch interface device converts the measurement value, which is the analog signal, into a digital signal using an analog to digital converter (ADC).

For example, as illustrated in FIG. 4, in the case in which the four sensors are disposed at four corners of a rectangle, the touch position may be calculated using a force-moment equilibrium equation. An x coordinate of the touch position may be represented by Equation 1, and a y coordinate thereof may be represented by Equation 2.

$$X = \frac{(f_2 + f_4) - (f_1 + f_3)}{f_1 + f_2 + f_3 + f_4} A \quad \text{[Equation 1]}$$

$$Y = \frac{(f_1 + f_2) - (f_3 + f_4)}{f_1 + f_2 + f_3 + f_4} B \quad \text{[Equation 2]}$$

Here, $f_1$, $f_2$, $f_3$ and $f_4$ are force data values measured by the respective sensors 130, A is a horizontal length of the touch substrate 110 and B is a vertical length of the touch substrate 110.

In the ideal position measurement algorithm as described above, position recognition errors occurs for the following reasons.

First, as illustrated in FIG. 5, in the case in which the sensor 130 is not accurately disposed at a defined layout position during a process of manufacturing a touch pad 100, the touch interface device inaccurately recognizes a touch position due to a misalignment of the sensor.

Second, as illustrated in FIG. 6, as a pressing direction (a vertical load direction by force touch) is twisted in response to a displacement of the touch substrate 110, the touch interface device may not accurately recognize the touch position.

Third, as illustrated in FIG. 7, recognition error of the touch position occurs for a reason such as torsion of the beam 140 on which the sensor 130 is supported.

Figure 8:
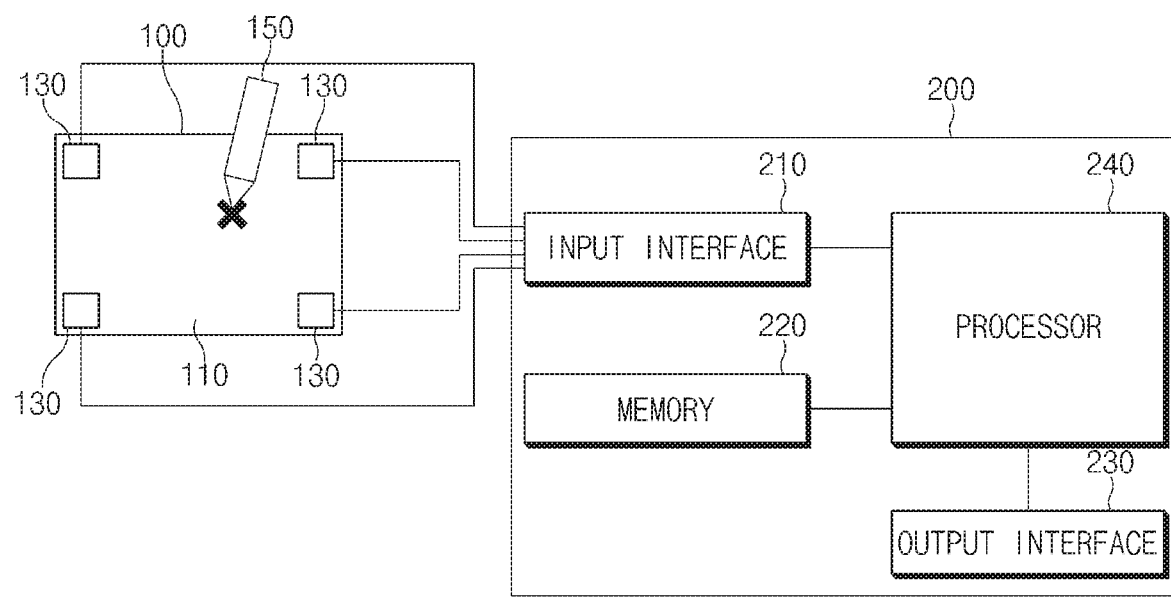
FIG. 8 is a block configuration diagram of a touch interface device according to exemplary embodiments of the present disclosure.
Figure 9:
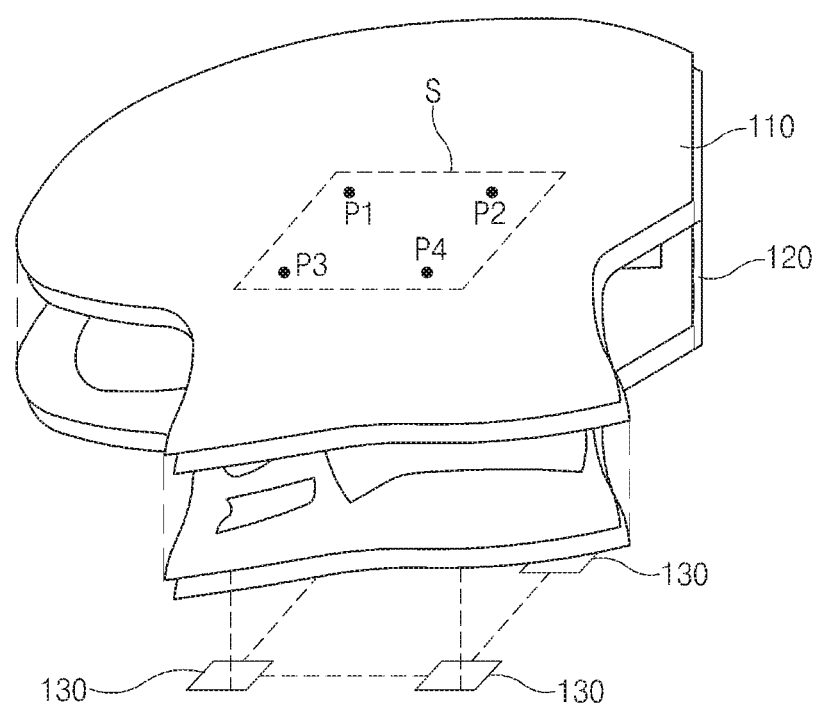
FIG. 9 is a view illustrating a selection of a calibration point on a touch substrate according to exemplary embodiments of the present disclosure.
Figure 10:
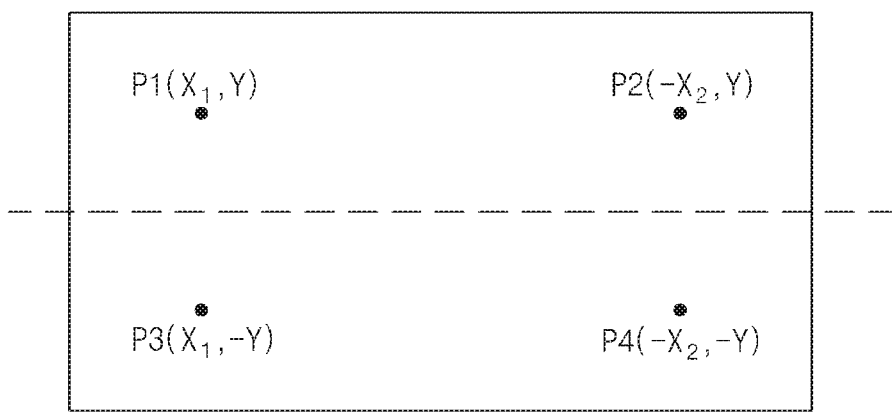
FIG. 10 is a view illustrating calibration points having symmetry according to exemplary embodiments of the present disclosure.

FIG. 8 illustrates a block configuration diagram of a touch interface device according to exemplary embodiments of the present disclosure, FIG. 9 is a view illustrating a selection of a calibration point on a touch substrate according to exemplary embodiments of the present disclosure, and FIG. 10 is a view illustrating calibration points having symmetry according to exemplary embodiments of the present disclosure.

The touch interface device includes the touch pad 110, an input device 150 and a controller 200, according to various embodiments.

The touch pad 100 includes the touch substrate 110, the torsion preventing structure 120 preventing the torsion of the touch substrate 110 and the plurality of sensors 130 measuring force touch applied to the touch substrate 110. The plurality of sensors 130 measures the force touch at different positions.

The input device 150 is a tool for applying the force touch having a predefined magnitude onto the touch substrate 110. In other words, the input device 150 is used to apply the same vertical load to two or more calibration points (touch points) during a calibration process.

When the force touch is applied to a predefined position of the calibration point on the touch pad 100, the controller 200 measures a position (a touch position) of the touch point to which the force touch is applied, and values of force output from the respective sensors 130.

In addition, when the process of applying the force touch to the calibration points is completed, the controller 200 estimates measurement values measured by the sensors 130 when the force touch is applied to the remaining calibration points to which the force touch is not applied using symmetry between the calibration points. The controller 200 compares force data which is actually measured when the force touch is applied to the calibration points with ideal force data to calculate a relationship between two data. The controller 200 stores the calculated relationship in the memory 220.

Thereafter, when the force touch is applied onto the touch pad 100, the controller 200 senses the applied force touch to correct manufacturing errors and errors caused by a structure of the touch pad 100 using a calibration process. Here, the process error refers to a misalignment of the sensor 130, errors related to a strain sensor motion refers to errors caused by a modification of the beam on which the sensor 130 is supported by shear force, and errors caused by the structure of the touch pad 100 refer to errors caused because the sensor is not vertically pressed due to an occurrence of displacement of the touch pad.

The controller 200 includes an input interface 210, a memory 220, an output interface 230 and a processor 240.

The input interface 210 is connected to the plurality of sensors 130 of the touch pad 100 to receive measurement data (e.g., a measurement value, a sensor value) from the respective sensors 130 or to transmit a control signal to the respective sensors 130.

The input interface 210 collects the measurement values measured by the respective sensors 130 at, or in, a defined sampling period. In addition, the input interface 210 converts the measurement value, which is an analog signal, collected by the sensor 130 into force data, which is a digital signal, using the ADC.

The memory 220 stores a force based touch position recognition algorithm, ideal force data (reference force data) and a calibration matrix. In addition, the memory 220 may temporarily store input and output data of the controller 200.

The memory 220 may be implemented as any one of storage media such as a flash memory, a hard disk, a secure digital (SD) card, a random access memory (RAM), a read only memory (ROM) and web storage.

The output interface 230 provides data communication with an external device connected to the controller 200. In other words, the output interface 230 transmits the output data output from the processor 240 to the external device, or receives data from the external device.

Here, the external device may be a display device, a navigation terminal, a variety of electronic control units, audio devices or mobile terminals mounted in a vehicle and the like.

The processor 240 enters a calibration mode for performing a calibration of the touch interface device at the time of an initial operation of the touch interface device. Although the present exemplary embodiment describes the case in which the processor enters the calibration mode at the time of the initial operation of the touch interface device, by way of example, the processor is not limited thereto, but may be modified in various exemplary embodiments. For example, the processor 240 enters the calibration mode when a user inputs a specific key which is separately prepared.

The processor 240 determines the number of calibration points on the touch substrate 110, positions thereof, touch strengths thereof, and a touch order thereof. The number of calibration points is determined according to the number of sensors 130. When the number n of sensors 130 is an even number, the processor 240 sets n/2 or more calibration points. When the number n of sensors 130 is an odd number, the processor 240 sets (n+1)/2 or more calibration points.

Thereafter, the processor 240 waits for a predetermined time until the force touch applied to the touch substrate 110 is sensed. The processor 240 outputs a warning sound or a guidance message through an output device (not shown) when the predetermined time lapses.

The user applies the force touch to the calibration points on the touch substrate 110 according to a defined touch order by oneself or a calibration tool. In this case, the user inputs the force touch at defined force (touch strength) using the input device 150. As illustrated in FIG. 9, in the case in which four measurement points within a specific region S on the touch substrate 110 are disposed to be symmetrical with each other based on a line passing through the center of gravity of the specific region S, the user may arbitrarily select two measurement points among the four measurement points to use the selected measurement points as the calibration points.

In a general calibration process, in the case in which the respective sensors 130 are disposed at corners of a rectangle, the user sequentially touches the four points on the touch substrate 110 with a defined force. When force F is applied to defined positions P1(x1, y1), P2(x2, y2), P3(x3, y3) and P4(x4, y4), the processor 240 measures forces at the respective positions using the sensors 130. Here, when the force touch is applied to defined positions P1, P2, P3 and P4, respectively, the values which are actually measured by the respective sensors 130 are $(p_{11}, p_{12}, p_{13}, p_{14})$, $(p_{21}, p_{22}, p_{23}, p_{24})$, $(p_{31}, p_{32}, p_{33}, p_{34})$ and $(p_{41}, p_{42}, p_{43}, p_{44})$, and ideal measurement values are $(f_{11}, f_{12}, f_{13}, f_{14})$, $(f_{21}, f_{22}, f_{23}, f_{24})$, $(f_{31}, f_{32}, f_{33}, f_{34})$ and $(f_{41}, f_{42}, f_{43}, f_{44})$.

The actual measurement values and the ideal measurement values have a difference due to the process error, and the like. Therefore, a relationship between the actual measurement values and the ideal measurement values may be defined by the following Equation 3, and the calibration matrix H may be obtained from Equation 3.

$$\begin{pmatrix} f_{11} & f_{21} & f_{31} & f_{41} \\ f_{12} & f_{22} & f_{32} & f_{42} \\ f_{13} & f_{23} & f_{33} & f_{43} \\ f_{14} & f_{24} & f_{34} & f_{44} \end{pmatrix} = H \begin{pmatrix} p_{11} & p_{21} & p_{31} & p_{41} \\ p_{12} & p_{22} & p_{32} & p_{42} \\ p_{13} & p_{23} & p_{33} & p_{43} \\ p_{14} & p_{24} & p_{34} & p_{44} \end{pmatrix} \quad \text{[Equation 3]}$$

The present exemplary embodiment decreases the number of input times of the force touch for the calibration using symmetry between the calibration points.

For example, as illustrated in FIG. 10, in the case in which the four measurement points P1 to P4 are disposed to be line symmetrical with each other, two measurement points P1 and P2 (or P1 and P4) among the four measurement points are determined as the calibration points.

It is assumed that when the force touch F is applied to P1($X_1$, Y), the measurement values measured by the four sensors 130 are $(p_{11}, p_{12}, p_{13}, p_{14})$, and when the force touch F is applied to P2($-X_2$, Y), the measurement values measured by the four sensors 130 are $(p_{21}, p_{22}, p_{23}, p_{24})$.

In this case, the measurement value of P3 ($X_1$, $-Y$) which is line symmetrical with P1 is $(p_{13}, p_{14}, p_{11}, p_{12})$ which is obtained from the measurement value of the P1, and the measurement value of P4($-X_2$, $-Y$) which is line symmetrical with P2 is $(p_{23}, p_{24}, p_{21}, p_{22})$ which is obtained from the measurement value of the P2. The above-mentioned results are applied to Equation 3 to generate the following Equation 4.

$$\begin{pmatrix} f_{11} & f_{21} & f_{31} & f_{41} \\ f_{12} & f_{22} & f_{32} & f_{42} \\ f_{13} & f_{23} & f_{33} & f_{43} \\ f_{14} & f_{24} & f_{34} & f_{44} \end{pmatrix} = H \begin{pmatrix} p_{11} & p_{21} & p_{13} & p_{23} \\ p_{12} & p_{22} & p_{14} & p_{24} \\ p_{13} & p_{23} & p_{11} & p_{21} \\ p_{14} & p_{24} & p_{12} & p_{22} \end{pmatrix} \quad \text{[Equation 4]}$$

When the number of sensors is an even number, the measurement values of P1 ($X_1$, Y) are $(f_{11}, f_{12}, f_{13}, \ldots f_{1(n/2)-1}, f_{1n/2}, \ldots f_{1n})$, values expected to be measured at a symmetrical point P3 ($X_1$, $-Y$) of the P1 are $(f_{1(n/2)+1}, f_{1(n/2)+2}, f_{1(n/2)+3}, \ldots, f_{11}, f_{12}, \ldots f_{1(n/2)})$.

Meanwhile, when the number of sensors is an odd number and a value of the sensor at a vertex of the line symmetry is $f_{11}$, if values measured at P1 ($X_1$, Y) are $(f_{11}, f_{12}, f_{13}, \ldots f_{1(n+1)/2}, f_{1(n+1)/2)+1}, \ldots f_{1n})$, values expected to be measured at P3($X_1$,$-Y$) are $(f_{11}, f_{1n}, f_{1n-1}, f_{1n-2}, \ldots, f_{1((n+1)/2)+1}, f_{1((n+1)/2)}, \ldots f_{12})$.

For example, when the number of sensors is 6, if the measurement values for the calibration points are $(f_{11}, f_{12}, f_{13}, f_{14}, f_{15}, f_{16})$, the measurement values for symmetrical points of the calibration points are $(f_{14}, f_{15}, f_{16}, f_{11}, f_{12}, f_{13})$, and when the number of sensors is 5, if the measurement values for the calibration points are $(f_{11}, f_{12}, f_{13}, f_{14}, f_{15})$, the measurement values for symmetrical points of the calibration points are $(f_{11}, f_{15}, f_{14}, f_{13}, f_{12})$.

As described above, in the case in which the number n of sensors is an even number, force data is measured by the plurality of sensors when the force touch F is applied to (n/2) calibration points, and the force data measured by the plurality of sensors is estimated when the force touch F is applied to the remaining (n/2) symmetrical points which are symmetric to the (n/2) calibration points based on the measured force data. As such, the calibration matrix is calculated using a total of n points, and when the number of sensors is the odd number, force data for (n+1)/2 calibration points is measured and the force data for the remaining (n+1)/2 symmetrical points which are symmetric to the (n+1)/2 calibration points is estimated, thereby calculating the calibration matrix using a total of (n+1) points.

When the force touch applied onto the touch substrate 110 is sensed, the processor 240 detects (collects) force data measured by the respective sensors 130. In this case, the processor 240 detects the force data measured by the plurality of sensors 130 when the force touch having the same magnitude is applied to each of the calibration points.

The processor 240 collects force data measured for each of the calibration points. In addition, the processor 240 calculates the force data expected to be measured by the respective sensors 130 when the force touch is applied to the symmetrical points of the calibration points based on the collected force data.

The processor 240 compares the measured force data and ideal force data with each other to calculate a relationship between the two data groups or figures. That is, the processor 240 compares the measured force data and the ideal force data with each other to calculate characteristics of the manufacturing error.

The processor 240 calculates calibration parameters using characteristics of the manufacturing error to generate the calibration matrix. In other words, the processor 240 calculates the calibration parameters from the calculated relationship.

The processor 240 stores the generated calibration matrix in the memory 220. The calibration matrix is used to correct errors between the force data measured by the sensors and the ideal force data. The processor 240 updates a prior calibration matrix which is preset in the memory 220 to a new calibration matrix generated by a calibration whenever the calibration is performed.

After the calibration is performed, in the case in which the force touch is applied onto the touch substrate 110, the processor 240 collects the force data measured by the respective sensors 130. The processor 240 corrects the manufacturing error within the collected force data using the calibration matrix. The processor 240 calculates the touch position to which the force touch is applied using the corrected force data. In this case, the processor 240 calculates the touch position using a force-moment equilibrium equation.

Figure 11:
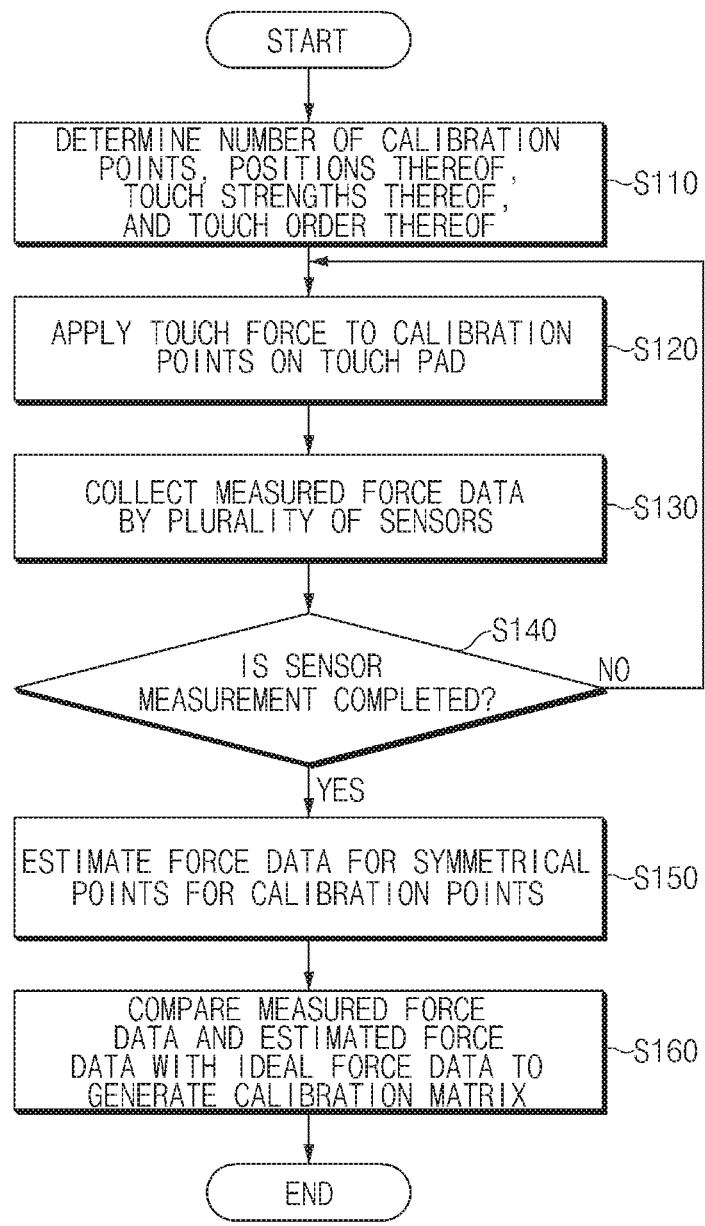
FIG. 11 is a flowchart illustrating a method for correcting a touch interface device according to exemplary embodiments of the present disclosure.

FIG. 11 is a flowchart illustrating a method for correcting a touch interface device according to exemplary embodiments of the present disclosure.

The controller 200 determines the number of calibration points, positions thereof, touch strengths thereof, and a touch order thereof (S110). In this case, the controller 200 determines the number of calibration points based on the number of force sensors 130 included in the touch pad 100.

The controller 200 senses a force touch applied to the calibration points on the touch pad 100 (S120). For example, a user applies the force touch having the same vertical load to any one of the calibration points which are symmetrically indicated on the touch substrate 110 using the input device 150. In this case, the controller 200 senses the force touch applied onto the touch substrate 110.

If the force touch is sensed, the controller 200 detects force data measured from the plurality of sensors 130 (S130). The controller 200 collects the measured force data by the respective sensors 130 using the input interface 210.

The controller 200 confirms whether or not the detection of the force data for the calibration points is completed (S140). That is, the controller 200 confirms whether more calibration points of which force data is to be measured exist.

The controller 200 estimates force data measured by the plurality of sensors 130 when the force touch having the same magnitude as that applied to the calibration points is applied to symmetrical points of the calibration points using the measured force data (S150).

The controller 200 compares the measured force data and the estimated force data with ideal force data to generate a calibration matrix (S160). The controller 200 calculates relationships between the measured force data for each of the calibration points and the estimated force data for each of the symmetrical points, and the ideal force data. The controller 200 calculates calibration parameters from the calculated relationships. The controller 200 forms the calibration matrix using the calculated calibration parameters.

Figure 12:
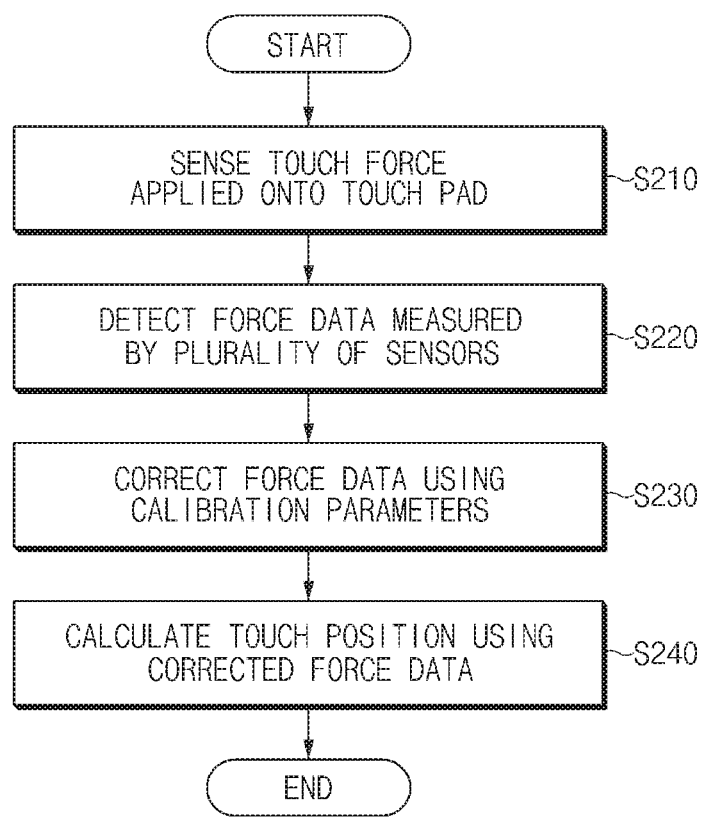
FIG. 12 is a flowchart illustrating a method for recognizing a touch position of a touch interface device according to exemplary embodiments of the present disclosure.

FIG. 12 is a flowchart illustrating a method for recognizing a touch position of a touch interface device according to exemplary embodiments of the present disclosure.

The controller 200 senses a force touch applied onto the touch pad 100 (S210). For example, if the user applies the force touch to one point on the touch substrate 110, the controller 200 senses the force touch.

The controller 200 detects force data measured by the plurality of sensors 130 (S220). The controller 200 collects the measured force data of the respective sensors 130 using the input interface 210.

The controller 200 corrects measured force touch data using the calibration matrix (S230). The controller 200 corrects process error included in the measured force touch data utilizing the calibration matrix stored in the memory 220.

The controller 200 calculates a touch position to which the force touch is applied using the corrected force touch data (S240). In this case, the controller 200 calculates the touch position using a force-moment equilibrium equation.

Although it has been mentioned that all components configuring the exemplary embodiments of the present disclosure described above are combined with each other as one component or are combined and operated with each other as one component, the present disclosure is not necessarily limited to the above-mentioned exemplary embodiments. That is, all the components may also be selectively combined and operated with each other as one or more components without departing from the scope of the present disclosure. In addition, although each of all the components may be implemented by one independent hardware, some or all of the respective components which are selectively combined with each other may also be implemented by a computer program having a program module performing some or all of functions combined with each other in one or plural hardware. Codes and code segments configuring the computer program may be easily deduced by those skilled in the art. The computer program as described above may be stored in computer readable media, and may be read and executed by a computer to implement the exemplary embodiments of the present disclosure.

As described above, according to the exemplary embodiments of the present disclosure, when the touch position on the force sensor based touch pad is measured, the process error caused by a misalignment of the sensor, the error caused by the bending of the beam to which the sensor is attached, and error caused by the tilt of the touch substrate are corrected, thereby making it possible to improve the accuracy of measurement of the touch position.

Further, in the case in which the touch interface device according to the present disclosure is applied to the vehicle, the search and the input may be classified by the force touch, thereby making it possible to implement the blind control.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A force based touch interface device comprising:
   a touch substrate;
   a torsion preventing structure disposed under the touch substrate and configured to prevent torsion of the touch substrate by an externally-applied force touch;
   a plurality of sensors disposed at different positions for measuring the force touch applied to the touch substrate, wherein at least two of the plurality of sensors are disposed to be symmetrical with each other relative to a line passing through a center of gravity of the touch substrate;
   an input device for applying the force touch onto the touch substrate; and
   a controller for:
      measuring first force data using at least one of the plurality of sensors when the force touch is applied to at least one first point on the touch substrate,
      estimating second force data for a second point, which is symmetrical with the at least one first point relative to the line passing through the center of gravity of the touch substrate, using the first force data, and
      generating a calibration matrix by comparing the first force data and the second, force data with ideal force data,
   wherein the controller compares the first and second force data with the ideal force data to calculate a relationship between the first and second force data and the ideal force data, and calculates calibration parameters from the calculated relationship to generate the calibration matrix.

2. The force based touch interface device according to claim wherein the torsion preventing structure includes:
   an edge frame arranged to correspond to the touch substrate, and
   a plurality of ribs disposed inside of the edge frame.

3. The force based touch interface device according to claim 1, wherein the torsion preventing structure includes a plurality of bars connected to one another to support a touch surface.

4. The force based touch interface device according to claim 1, wherein the plurality of sensors include any one of a strain gauge, a force sensitive resistor (FSR) and a capacitive sensor.

5. The force based touch interface device according to claim wherein a number of first point is determined according to a number of sensors.

6. The force based touch interface device according to claim 1, wherein a manufacturing error is an error caused by a misalignment of the respective sensors.

7. The force based touch interface device according to claim 1, wherein the controller corrects the first force data using the calibration matrix, and calculates a touch position to which the force touch is applied by applying the corrected force data to a force moment equilibrium equation.

8. A method for correcting a force based touch interface device including a torsion preventing structure disposed under the touch substrate and configured to prevent torsion of a touch substrate, the method comprising:
   collecting first force data using at least one of a plurality of sensors disposed at different positions when a force touch is applied to at least one first point on the touch substrate, wherein at least two of the plurality of sensors are disposed to be symmetrical with each other relative to a line passing through a center of gravity of the touch substrate;
   estimating second force data for a second point, which is symmetrical with the at least one first point relative to the line passing through the center of gravity of the touch substrate, based on the first force data; and
   generating a calibration matrix for correcting a manufacturing error by comparing the first force data and the second force data with ideal force data,
   wherein in the generating a calibration matrix, the first force data and the second force data are compared with the ideal force data to calculate a relationship between the first and second force data and the ideal force data, and
   wherein calibration parameters are calculated from the calculated relationship to generate the calibration matrix.

9. The method according to claim 8, further comprising, before the collecting the first force data, defining a number of first point, positions thereof, touch strengths thereof and a touch order thereof.

10. The method according to claim 9, wherein the number of touch points is n/2 or more when the number n of sensors is an even number.

11. The method according to claim 9, wherein the number of touch points is (n+1)/2 or more when the number n of sensors is an odd number.

12. The method according to claim 8, further comprising, after the generating the calibration matrix:
   correcting the process error included in the first force data using the calibration matrix; and
   calculating a touch position using the corrected force data.

* * * * *